Dec. 29, 1953   J. L. LEE   2,663,972
MOVABLE DOLL'S EYE
Filed Jan. 31, 1951
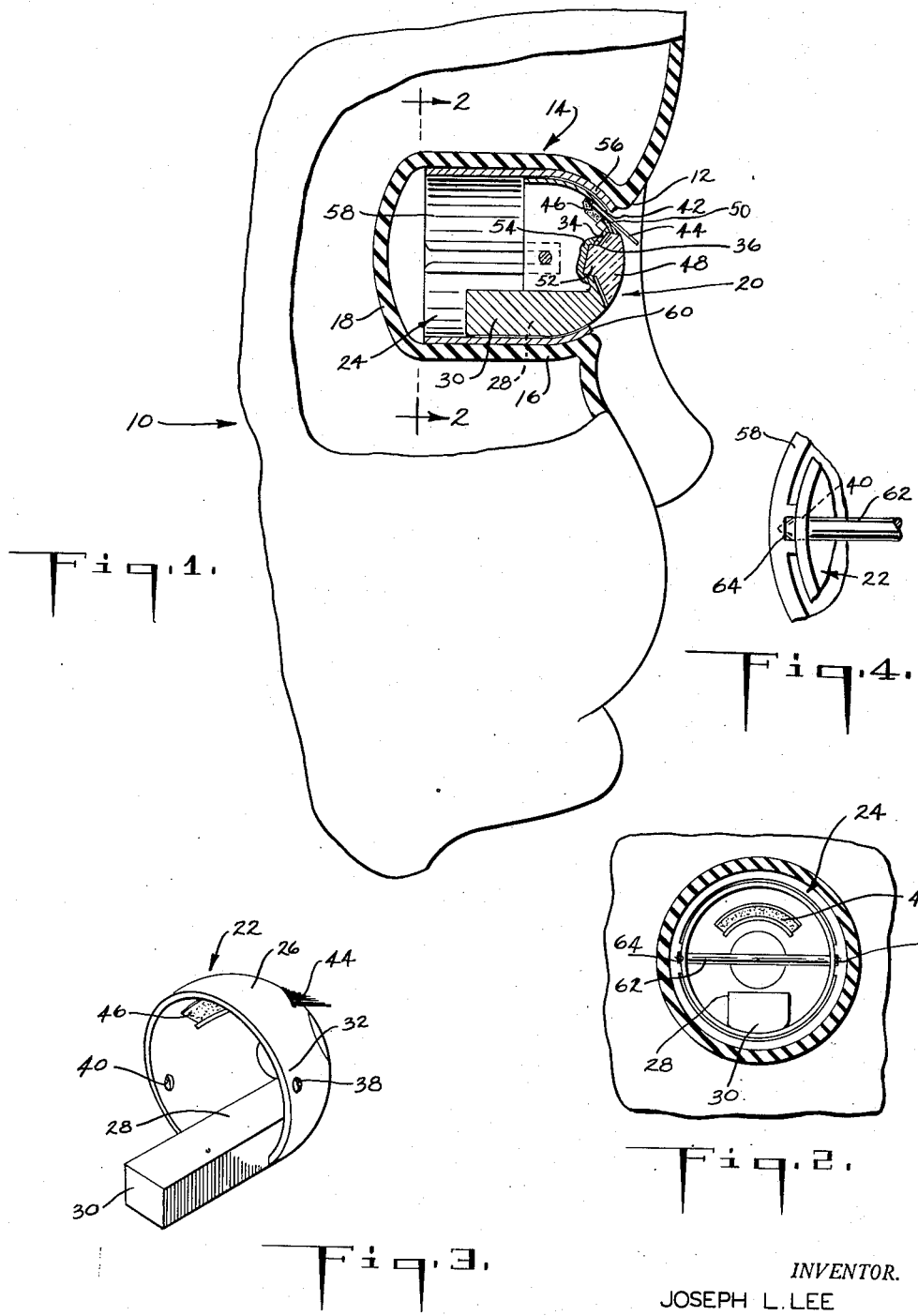
INVENTOR.
JOSEPH L. LEE
BY
ATTORNEY

Patented Dec. 29, 1953

2,663,972

UNITED STATES PATENT OFFICE 2,663,972

MOVABLE DOLL'S EYE

Joseph L. Lee, Bergen County, N. J., assignor, by mesne assignments, to Margon Corporation, Bayonne, N. J., a corporation of New Jersey Application January 31, 1951, Serial No. 208,788

4 Claims. (Cl. 46—169)

This invention relates to a movable doll's eye, i. e. a so-called "sleeping eye," of a type which is adapted to be employed in a soft, e. g. rubber, doll's head. More particularly, the present invention pertains to an individually movable doll's eye which is adapted to be disposed in a socket in a doll's head, and to be entirely independent and separate from and unconnected to the other of the pair of eyes in said head. Even more specifically, a doll's eye embodying the present invention is of the type which has no parts, movable or stationary, located within the hollow interior of the head, aside from the socket itself, and which therefore can be inserted through an eye opening on the exterior of the head.

It is an object of my invention to provide an eye of the character described which comprises very few parts, is of a particularly simple and rugged construction, and whose components can be manufactured at a low cost by mass production methods.

It is another object of my invention to provide an eye of the character described which can be assembled with great rapidity and with little chance of error by comparatively unskilled labor.

It is another object of my invention to provide an eye of the character described constituting two principal relatively rotatable parts, neither of which has a spherical surface extending over more than 180 degrees, and neither of which is worked by tools during joinder, so that assembly thereof is quick and easy.

It is another object of my invention to provide a movable eye of the character described which does not require any special shape of socket for installation of the eye.

It is another object of my invention to provide a movable eye of the character described in which all the parts are fully or substantially fully housed within an eyeshell, and yet wherein no additional elements are incorporated for the purpose of limiting rotation of the eyeball.

Other objects of my invention will in part be obvious and in part will be pointed out hereinafter.

My invention accordingly consists in the features of construction, combinations of elements and arrangements of parts which will be exemplified in the construction hereinafter described and the scope of which will be indicated in the appended claims.

In the accompanying drawings in which is shown one of the various possible embodiments of my invention, Fig. 1 is a fragmentary side view of a doll's head, the same being partially in section better to illustrate details of the improved doll's eye;

Fig. 2 is a sectional view taken substantially along the line 2—2 of Fig. 1;

Fig. 3 is a perspective view of the eyeball; and

Fig. 4 is an enlarged fragmentary view of the doll's eye in the region of an end of the eye shaft.

Referring now in detail to the drawings, the reference numeral 10 denotes a hollow doll's head made of a comparatively soft elastomeric substance, such, for example, as rubber, the same being of conventional external configuration. The head is self-form maintaining, in that it will assume and maintain the configuration to which it initially was shaped unless manually deformed.

Said head includes a pair of eye openings 12, from which eye sockets 14 extend rearwardly. Each socket defines a cavity that is completely closed except for the eye opening. More specifically, each socket 14 constitutes a side wall 16 of approximately tubular shape which is closed at its rear by a back wall 18 and is integrally joined at its forward edge to the doll's head. The socket, like the head, is made of a comparatively thin elastomeric substance and, therefore, can be deformed or stretched with comparative ease.

Pursuant to my invention, I provide a movable doll's eye 20 which includes an oscillatable eyeball 22 and a stationary eyeshell 24.

Said eyeball includes a forward portion 26 in the shape of one-half of a surface of revolution. This preferably is a semi-spherical segment, i. e. a hemisphere. Desirably, the eyeball is made in a diecasting operation using a conventional diecasting machine so that the shape of the surface of revolution may be substantially true.

The eyeball includes an internal thick segment 28 across its bottom, the back surface of said segment having a rearwardly extending squat projection 30. Said segment and projection are cast in one piece with the eyeball.

Except for the segment and projection, the eyeball is a hollow shell and the thickness of the forward portion thereof is substantially uniform; although, if desired, any parts of this portion which may be subjected to undue stress, or which are unduly weakened because of some structural modification, can be reinforced by thickening the eyeball at such parts.

The eyeball also includes a short round tubular portion 32 extending rearwardly from and in one piece with the back edge of the hemisphere. It is desirable, for reasons which shortly will be apparent, to keep this portion as short as is possible, consistent with the provision of sufficient metal for structural strength.

The forward portion of the hemisphere is diecast with a lens-receiving frusto-conical seat 34, having a central opening 36. It will be observed that the spherical configuration of the hemisphere is a true circular section right up to the free edge of the seat 34.

In the plane where the hemisphere joins the tubular portion 32, the eyeball is provided with a pair of diametrically opposed holes 38, 40, which may be formed either during the die-casting operation or subsequently, as by punching or piercing. It is to be observed that it is in order to provide sufficient metal for the formation of these holes that the tubular portion 32 is included in the eyeball so that, if desired, said portion may be abbreviated, save around the holes and at the segment and projection.

Optionally, the eyeball further is provided with a long narrow arcuate slit 42 that is located above the seat 34 and is centered with respect thereto. The portion of the eyeball intermediate to the seat and slit can be depressed slightly in order to provide a support for eyelashes 44. The slit and depressed portion either can be formed during the die-casting operation or subsequent thereto. The eyelashes are inserted through the slit and are held in place as by a layer 46 of a cementitious substance or adhesive tape, e. g. a pressure-sensitive tape.

A lens 48 is received in the seat 34. Said lens may be fabricated from a synthetic plastic, preferably a thermoplastic, so that it can be injection-molded. The lens includes a frusto-conical back surface which is shaped to conform snugly to the contour of the seat 34 and which corresponds to the iris of the eye. It also has a cylindrical center portion 52 which corresponds to the pupil of the eye. The front surface of the lens constitutes a segment of a sphere having the same radius as the hemisphere 26. Inasmuch as both the lens and the eyeball are cast, the lens can be made to have an accurate fit in the seat; the edge of the lens will coincide substantially exactly with the edge of the seat, and the front surface of the lens will form a substantially unbroken continuation of the outer spherical surface of the eyeball.

In order to permit the eyelashes to be located close to the lens, without unduly weakening the eyeball, a portion of the frusto-conical seat 34 adjacent the eyelash slit 42 may be mutilated to increase the space between the seat and the slit. In effect, said seat is truncated by a plane parallel to the axis of symmetry of the seat and perpendicular to a line running between said axis and the center of the eyelash slit. As a result, the portion of the seat near the eyelash slit constitutes a flat rearwardly extending wall 50. The lens 48 is shaped to match this configuration of the seat.

The lens is held in place in the eyeball in any suitable fashion. For example, the pupil portion of the lens is a rearwardly extending centrally located stub 52 of relatively small diameter which extends through the aforementioned opening 36 in the seat, and which has its rear face covered with a layer 54 of paint or lacquer.

The eyeshell 24 is in some respects similar to the eyeball. Thus, the eyeshell desirably is die-cast in a conventional die-casting machine and includes a forward portion 56 in the shape of a surface of revolution which is geometrically similar to the forward portion 26 of the eyeball. The shape of said forward portion 56 in the preferred form of my invention is that of a spherical segment, viz, a hemisphere. The shape of said surface also is substantially true. The hemisphere 56 has an inner diameter which is slightly larger than the outer diameter of the hemisphere 26, the difference in radius, for example, being in the order of ten to fifteen thousandths of an inch. The purpose for this clearance will be described hereinafter. The eyeshell is hollow and the thickness of the forward portion is substantially uniform throughout in order to permit the eyeball to turn within the eyeshell.

The eyeshell further includes a round tubular portion 58 extending rearwardly from the back edge of the hemisphere 56. Said tubular portion 58 is sufficiently long to cover the weight projection 30 in any angular position thereof.

From one viewpoint it may be said that because the eyeshell has a diametrical dimension only slightly larger than that of the eyeball it defines the diametrical ambit of the eyeball, and in respect to the combined eyeball and weight it will be noted that the integral metal weight has substantial mass for dependable operation of the eyeball although it is devoid of a weight arm and despite the fact that the weight is confined generally within the diametrical ambit of the eyeball so that both the eyeball and its integral weight may be housed within the eyeshell.

The forward portion of the hemisphere 56 is die-cast with an opening 60 that is elongated in a direction parallel to the axes of generation of the surfaces of revolution of the eyeball and eyeshell, that is, in horizontal direction when the head is upright. The opening is tapered toward its ends so as to approximate the shape of the eye opening in a human head.

The eyeball is mounted to rotate within the eyeshell by means of a shaft 62 which extends through the registered holes 38, 40, and which has its opposite ends secured on the inner surface of the eyeshell. Said shaft is located to coincide with axes of generation of the surfaces of revolution of the eyeball and eyeshell, i. e. with the major diameters of the hemispheres 26, 56 which are parallel to the longitudinal axis of the opening 60 and lie in the plane where the hemispheres are joined to their respective tubular portions 32, 58.

To expedite mounting of the shaft in its proper position within the eyeball, the eyeshell is formed with two shallow diametrically opposite internal lead-in grooves 64, 66 that run forwardly from the rear edge of the eyeshell to the plane where the hemisphere 56 joins the tubular portion 58. Said grooves may be formed by provision of channels in the thickness of the wall or by pairs of shallow ridges projecting from the wall. The closed ends of the grooves are disposed in the desired operative position of the shaft.

The tips of the shaft are pointed, for instance, by cutting the ends of the shaft at an acute angle. The length of the shaft from tip to tip slightly exceeds the distance between the bases of the two grooves, the difference being in the order of a few, e. g. three-thousandths of an inch. The diameter of the shaft is less than the diameters of the openings 38, 40, the difference in the diameters preferably not exceeding the difference in radius between the eyeball and eyeshell.

To assemble the eye, the shaft is inserted through the openings 38, 40, with its tips extending beyond the outer surface of the eyeball. The eyeshell is grasped between two fingers and squeezed to slightly and temporarily distort the same. The shell is squeezed at points 90° from the grooves 64, 66 and at the tubular portion 58, so that the grooves are shifted apart. The eyeball now is introduced into the eyeshell, the ends of the shaft riding in the grooves until they abut against the closed ends of the grooves. Pressure on the eyeshell then is released and the sharp tips of the shaft thereupon will be imbedded in the eyeshell.

It will be observed that, as the eyeball turns, the rear edge of the tubular portion 32 sweeps through a path slightly larger in diameter than the hemisphere 26, and it is for this reason principally that a slight clearance is provided between the eyeball and eyeshell and between the shaft 62 and openings 38, 40.

Rotation of the pupil upwardly within the shell is limited by abutment of projection 30 against the bottom of the tubular portion 58, as indicated in Fig. 1. Rotation of the pupil downwardly is limited either by abutment of the eyelashes against the lower edge of the opening 60 or by abutment of the projection 30 against the top of the tubular portion 58, said projection being of the proper length to strike the top of the tubular portion when the eyeball has turned about 90° from the position shown in Fig. 1.

A doll's eye constructed in the foregoing manner can be inserted in an eye socket 14 from the front, inasmuch as there is no connection whatsoever with the other doll's eye in the same head. This permits the two sockets to be closed from the back, and thus prevents any dirt or foreign matter from entering the open back of the eye. Thus, I am able to make practical use of an eye which is far less expensive to manufacture and assemble than one wherein the eyeshell constitutes a substantially complete sphere.

It further will be noted that despite the open back the eyeball is free to rotate without interference from the back wall 18 of the socket inasmuch as the tubular extension 58 holds said wall away from the counter-weight projection 30.

Preparatory to inserting the eye in a socket, the opening is stretched to pass the eye, so that when the opening is released the eye will be held in place by the frictional grip of the socket thereon. The slight likelihood of the eye shifting in the head under these circumstances is further reduced by the shape of the eyeshell which obviously is non-symmetrical about two reference axes and which also desirably is made non-symmetrical about the third reference axis by casting the eyeshell so that the tubular portion 58 is flattened somewhat at the ends of the shaft 62. The flattening need only be slight, indeed so slight that it cannot be seen on the drawings. In an actual eye embodying my invention, the diameter of the tubular extension 58 parallel to the shaft 62 is about ten-thousandths of an inch shorter than the diameter perpendicular to said shaft.

It thus will be seen that I have provided a device which achieves the several objects of my invention and is well adapted to meet the conditions of practical use.

Because various possible embodiments might be made of the above invention and inasmuch as various changes might be made in the embodiment above set forth, it is to be understood that the matter herein described or shown in the accompanying drawings is to be interpreted as illustrative and not in a limiting sense. The reference in the claims to the eyeball and weight being made of a single integrally molded body of material is not intended to exclude the use of a separately made lens portion inserted in the eyeball as here shown.

Having thus described my invention I claim as new and desire to secure by Letters Patent:

1. An independent separately operable movable doll's eye, said eye comprising an eyeball and a weight both housed within an eyeshell having an eye opening, said eyeshell having a diametrical dimension only slightly larger than that of the eyeball but sufficient to provide clearance for rotation of the eyeball within the eyeshell, said eyeball and weight having structural characteristics resulting from having been die-cast from a single integrally formed body of metal, said eyeball including a forward portion having a generally hemispherical shape, said weight comprising a solid segment occupying a substantial portion of the lower half of the eyeball and having a projection which extends rearwardly of the rear edge of the eyeball, whereby said integral metal weight has substantial mass for dependable operation of the eyeball although devoid of a weight arm and while confining the weight generally within the diametrical ambit of the eyeball so that both the eyeball and its integral weight may be housed within the aforesaid eyeshell.

2. An independent separately operable movable doll's eye, said eye comprising an eyeball and a weight both housed and pivotally mounted within an eyeshell having an eye opening, said eyeshell having a diametrical dimension only slightly larger than that of the eyeball but sufficient to provide clearance for rotation of the eyeball within the eyeshell, said eyeball and weight having structural characteristics resulting from having been die-cast from a single integrally formed body of metal, said eyeball having a seat at the front receiving a lens simulating the iris and pupil portions of the eye and including a forward portion having a generally hemispherical shape, said weight comprising a solid segment occupying a substantial portion of the lower half of the eyeball and having a projection which extends rearwardly of the rear edge of the eyeball, whereby said integral metal weight has substantial mass for dependable operation of the eyeball although devoid of a weight arm and while confining the weight generally within the diametrical ambit of the eyeball so that both the eyeball and its integral weight may be housed within the aforesaid eyeshell, said integral eyeball and weight having no undercuts transverse to the fore-and-aft axis of the weight.

3. An independent separately operable movable doll's eye, said eye comprising an eyeball and a weight both housed and pivotally mounted within an eyeshell having an eye opening, said eyeshell comprising a generally hemispherical forward portion and a tubular rear portion, said eyeshell having a diametrical dimension only slightly larger than that of the eyeball but sufficient to provide clearance for rotation of the eyeball within the eyeshell, said eyeball and weight having structural characteristics resulting from having been die-cast from a single integrally formed body of metal, said eyeball including a forward portion having a generally hemispherical shape, said weight comprising a solid segment occupying a substantial portion of the lower half of the eyeball and having a projection which extends rearwardly of the rear edge of the eyeball, whereby said integral metal weight has substantial mass for dependable operation of the eyeball although devoid of a weight arm and while confining the weight generally within the diametrical ambit of the eyeball so that both the eyeball and its integral weight may be housed within the aforesaid eyeshell, said tubular portion extending further rearwardly than said projection in any angular position of the eyeball and weight.

4. An independent separately operable movable doll's eye, said eye comprising an eyeball and a weight both housed within an eyeshell having an eye opening, said eyeshell having a diametrical dimension only slightly larger than that of the eyeball but sufficient to provide clearance for rotation of the eyeball within the eyeshell, said eyeball and weight having structural characteristics resulting from having been die-cast from a single integrally formed body of metal, a shaft for pivotally mounting said eyeball and weight within said eyeshell, said eyeball including a forward portion having a generally hemispherical shape, said weight comprising a solid segment occupying a substantial position of the lower half of the eyeball and having a projection which extends rearwardly of the rear edge of the eyeball, whereby said integral metal weight has substantially mass for dependable operation of the eyeball although devoid of a weight arm and while confining the weight generally within the diametrical ambit of the eyeball so that both the eyeball and its integral weight may be housed within the aforesaid eyeshell, said eyeshell having diametrically opposite grooves to guide the shaft into position where the eyeball is located adjacent the eye opening of the eyeshell, the horizontal distance between said grooves being less than the length of said shaft when the eyeshell is in normal undistorted position, but being more than the length of said shaft when the eyeshell is distorted by pressure applied against the top and bottom of the eyeshell.

JOSEPH L. LEE.

References Cited in the file of this patent

UNITED STATES PATENTS

| Number | Name | Date |
|---|---|---|
| 1,177,393 | Denivelle | Mar. 28, 1916 |
| 1,859,321 | Wilhelm | May 24, 1932 |
| 1,947,294 | Grubman | Feb. 13, 1934 |
| 1,981,333 | Schavoir | Nov. 20, 1934 |
| 2,039,928 | Popovich | May 5, 1936 |
| 2,050,884 | Grubman | Aug. 11, 1936 |
| 2,133,635 | Schaeffer | Oct. 18, 1938 |
| 2,143,029 | Popovich | Jan. 10, 1939 |
| 2,546,682 | Wilhelm | Mar. 27, 1951 |

FOREIGN PATENTS

| Number | Country | Date |
|---|---|---|
| 623,238 | Great Britain | May 13, 1949 |
| 642,065 | Great Britain | Aug. 23, 1950 |